(12) United States Patent
Garretson

(10) Patent No.: US 7,019,496 B1
(45) Date of Patent: Mar. 28, 2006

(54) DEMAND RESPONSIVE POWER GENERATION SYSTEM

(76) Inventor: Donald H. Garretson, Rte. 1, Box 139G, Macomb, OK (US) 74852

( * ) Notice: Subject to any disclaimer, the term of this patent is extended or adjusted under 35 U.S.C. 154(b) by 0 days.

(21) Appl. No.: 11/009,276

(22) Filed: Dec. 8, 2004

Related U.S. Application Data

(60) Provisional application No. 60/528,324, filed on Dec. 9, 2003.

(51) Int. Cl.
*H02P 9/00* (2006.01)

(52) U.S. Cl. .............................. 322/19; 322/29; 322/59; 322/28; 322/18; 322/27; 320/104

(58) Field of Classification Search ................. 322/19, 322/18, 27, 28, 59; 320/104
See application file for complete search history.

(56) References Cited

U.S. PATENT DOCUMENTS

| | | | |
|---|---|---|---|
| 3,459,553 A | 8/1969 | Walworth | |
| 3,832,853 A | 9/1974 | Butler, Jr. | |
| 3,938,337 A | 2/1976 | Fawcett et al. | |
| 3,996,741 A | 12/1976 | Herberg | |
| 4,010,614 A | 3/1977 | Arthur | |
| 4,100,743 A | 7/1978 | Trumbull et al. | |
| 4,103,493 A | 8/1978 | Schoenfelder | |
| 4,237,692 A | 12/1980 | Ahrens et al. | |
| 4,249,084 A | 2/1981 | Villanueva et al. | |
| 4,288,989 A | 9/1981 | Cassidy | |
| 4,370,559 A | 1/1983 | Langley, Jr. | |
| 4,462,213 A | 7/1984 | Lewis | |
| 5,685,151 A | 11/1997 | Ross | |
| 5,685,152 A | 11/1997 | Sterling | |
| 5,754,030 A * | 5/1998 | Maehara et al. .............. | 322/19 |
| 5,845,479 A | 12/1998 | Nakhamkin et al. | |
| 5,905,357 A * | 5/1999 | Kawasaki .................... | 320/104 |
| 6,175,217 B1 * | 1/2001 | Da Ponte et al. ............. | 322/19 |
| 6,230,496 B1 | 5/2001 | Hofmann et al. | |
| 6,232,671 B1 | 5/2001 | Gottfried, Jr. | |
| 6,426,609 B1 * | 7/2002 | Tanaka et al. ................ | 322/19 |
| 6,700,353 B1 * | 3/2004 | Asada ......................... | 322/28 |

* cited by examiner

*Primary Examiner*—Nicholas Ponomarenko
*Assistant Examiner*—Iraj A. Mohandesi
(74) *Attorney, Agent, or Firm*—Fellers, Snider, et al.; Daniel P. Dooley

(57) ABSTRACT

A method and apparatus for generating power in a demand responsive manner is disclosed. The apparatus includes a controller monitoring power demand conditions to determine activation of an energy delivery system. The energy delivery system responds to the controller by providing rotational energy through release of a power transfer and brake unit, which permits descent of a suspended mass as a means for providing rotational energy. The rotational energy is transferred to a generator through a combining gear box and transmission communicating with the energy delivery system. The controller modulates the power transfer and brake unit to maintain the rate at which the mass descends to assure that a predetermined, substantially constant RPM of the generator is maintained for generation of power by steps for generating power.

20 Claims, 3 Drawing Sheets

DEMAND RESPONSIVE POWER GENERATION SYSTEM

RELATED APPLICATIONS

The present application claims priority to U.S. Provisional Application No. 60/528,324 filed Dec. 9, 2003, entitled Demand Responsive Power Generation System.

FIELD OF THE INVENTION

The claimed invention relates to the field of power generation. More particularly, but not by way of limitation, to a combination for providing localized on-demand power generation, wherein the power is available on demand at a demand matching output rate for a predetermined period of time.

BACKGROUND

One key component of many electrical power generation systems is a fuel source for use in powering generators that produce electrical energy. In essence, power generation is the science of converting one, or a number of energy forms, i.e., the fuel source, into electrical power. Among the more common energy forms or fuel sources used in the production of electrical power are atomic fuel rods, fossil fuels, solar energy, wind, and water flow. Each of these sources has drawbacks.

Atomic fuel rods carry with them a problem of disposing of radioactive spent fuel rods. Fossil fuels are a non-renewable resource (at least for the foreseeable future), the burning of which adds to air pollution and potentially global warming. Solar energy is available only during daylight hours, necessitating energy storage techniques for use of the generated power during non-daylight hours. Wind can be unpredictable and unavailable on demand, and also typically necessitates energy storage techniques for use of the generated power during non-windy days. Water flow as a source for power generation may be unfeasible in regions with a topography non-conducive to building hydroelectric dams.

As such, challenges remain and a need persists for improvements in methods and apparatus for power generation systems that provide power on demand at a variable rate for a predetermined period of time.

SUMMARY OF THE INVENTION

In accordance with preferred embodiments, an apparatus and method for generation of emergency power is provided. In an embodiment, the apparatus preferably includes a controller monitoring power demand conditions to determine appropriate activation and deactivation of an energy delivery system. The energy delivery system responds to the controller by providing rotational energy through release of a power transfer and brake unit (PT&B), which permits descent of a suspended mass as a means for providing rotational energy. The rotational energy is preferentially transferred to a generator through a combining gear box and transmission communicating with the energy delivery system. The controller modulates the power transfer and brake unit to maintain the rate at which the mass descends to assure that a predetermined, substantially constant RPM of the generator is maintained for generation of power.

In an alternate embodiment, the method preferably includes; determining a loss of power with a controller receiving an input signal from a power interrupt sensor, activating a first power transfer and brake unit, and releasing a first mass, the descent of which turns a generator. The process preferably continues with the controller monitoring the demand load being placed on the generator, the rotational speed and temperature of each of a plurality of sprag clutches, and the position and rate of descent of the first mass. The position and rate of descent of the first mass is preferably provided by a position sensor.

To preferably maintain rotation of the generator at a predetermined, substantially constant RPM, the controller modulates the first PT&B in response to the load placed on the generator, the rotational speed of the generator, the temperature of each of a plurality of sprag clutches, and the position of the first mass. In a preferred embodiment, based on either the first mass reaching nearly the extent of its descent capability, or the load on the generator demanding more output from the generator, the controller releases a second PT&B to bring on line a second energy source delivery system. The second energy source delivery system is brought on line by release of the second mass to continue to turn the generator at the predetermined, substantially constant RPM.

Preferably, if the first mass is approaching the extent of its descent, the controller halts activation of the first PT&B, which suspends descent of the first mass, and modulates the second PT&B in response to the load placed on the generator, the rotational speed of the generator, the temperature of each of the plurality of sprag clutches, and the position of the second mass. While operating the generator from the second energy source delivery system, the controller activates a first retrieval unit, which returns the first mass to its full-up position.

It is noted that the rewinding of the first mass may occur concurrently with the operation of the second energy delivery system, or independent from the operation of the second energy delivery system. Conversely, during operation of a first energy delivery system, the second mass may be raised to its full-up position. It is also noted that both the first and second energy delivery systems may be operated simultaneously through the incorporation of a combining gear box and transmission.

These and various other features and advantages that characterize the claimed invention will be apparent upon reading the following detailed description and upon review of the associated drawings.

DETAILED DESCRIPTION

Reference will now be made in detail to one or more examples of the invention depicted in the figures. Each example is provided by way of explanation of the invention, and not meant as a limitation of the invention. For example, features illustrated or described as part of one embodiment may be used with another embodiment to yield still a different embodiment. Other modifications and variations to the described embodiments are also contemplated within the scope and spirit of the invention.

Figure 1:
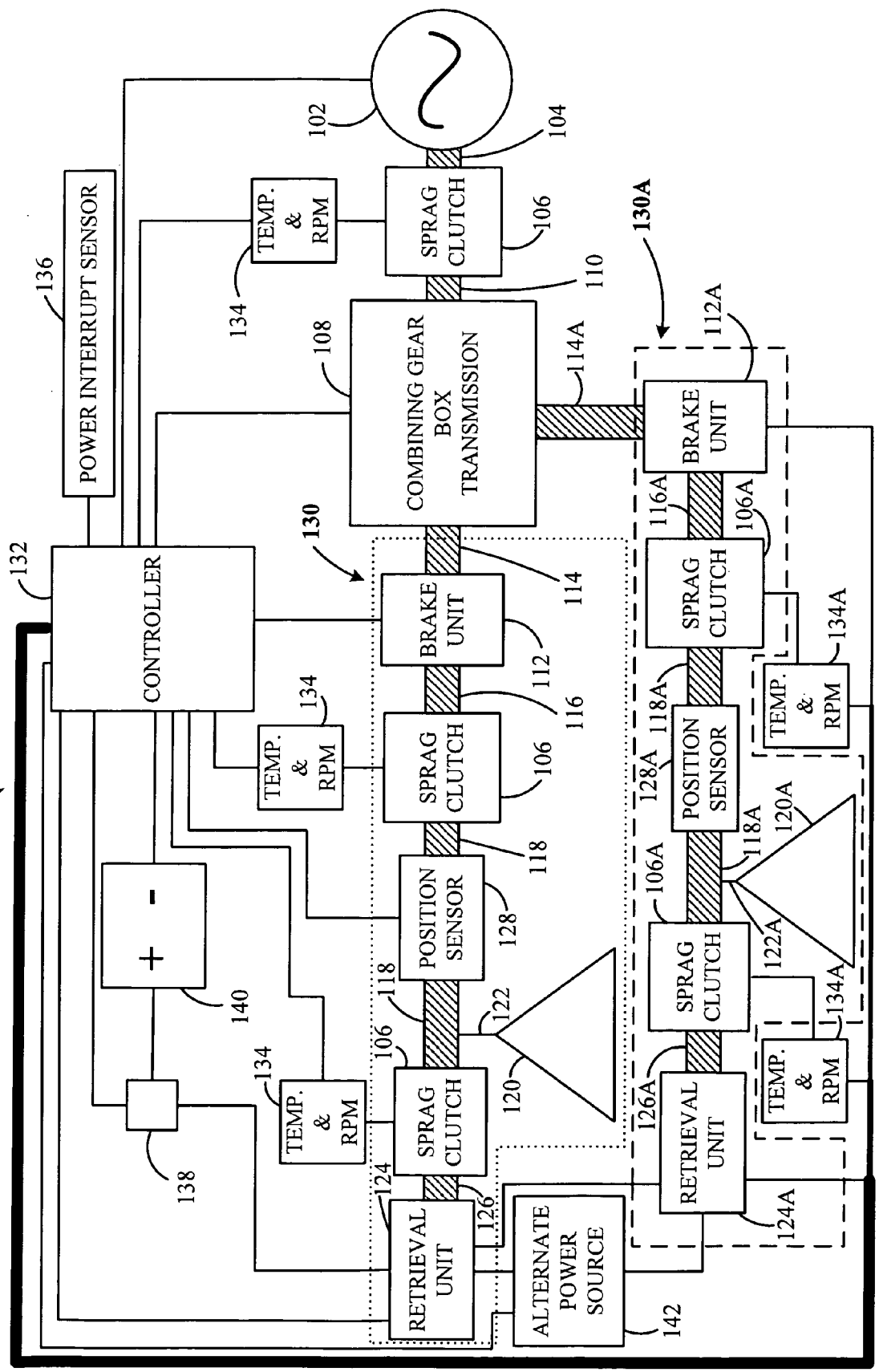
FIG. 1 is a functional block diagram of a demand responsive power generation system of the present invention.

Referring to the drawings, FIG. 1 shows a block diagram of a scalable, power generation system 100 (also referred to as power station 100) having an electrical power generator (generator) 102 communicating with a generator shaft 104. The generator shaft 104 further communicates with one of a plurality of clutches 106, such as sprag clutches. As covered in greater detail during the discussion of FIGS. 2 and 3, a sprag clutch is a free-wheel device having an inner race, which can be either the input or output member, and an outer race. The input member can be arranged to drive the output member in a chosen direction and will then be able to over-run in the opposite direction and/or permit the output member to over-run in the same direction.

The first clutch 106 further communicates with a combining gear box transmission (GBT) 108 via a gear box shaft 110. The GBT 108 receives rotational input from a power transfer and one way brake unit (PT&B unit) 112 through a PT&B shaft 114. The PT&B unit 112 modulates rotation of a coupling shaft 116 to regulate a rotational output of the GBT at a substantially constant, predetermined rotational velocity, i.e., a predetermined number of revolutions per minute (RPM), in response to a level of load placed upon the generator 102.

A second clutch 106 is used for transfer of a rotational kinetic energy from a drive shaft 118 to the PT&B unit 112. The rotational kinetic energy transferred by the drive shaft 118, emanates from a mass 120 suspended from the drive shaft 118 by a rotational coupling means 122. Without imposing a limitation on the present invention, but by way of example only, a steel rope cable wound around the drive shaft, which unwinds from the drive shaft 118 as the mass 120 lowers, and rewinds onto the drive shaft 118 during a rising of the mass 120 by a retrieval unit 124, has been found useful as the rotational coupling means 122.

A third clutch 106 couples the drive shaft 118 to a retrieval shaft 126 coupled to the retrieval unit 124. However, it is noted that the third clutch 106 coupled to the retrieval unit 124 is active in a direction opposite from a direction of operation of both the first clutch 106, and the second clutch 106. In other words, if the direction of rotation of the drive shaft 118 caused by the falling mass 120 is clockwise, the third clutch 106 is inactive, which precludes interaction between the retrieval unit 124 and the drive shaft 118, while the first and second clutches 106 are both active in transferring the kinetic energy developed in the drive shaft 118 to the generator 102, for the production of electrical power.

Conversely, during a process of returning the mass 120 to a full-up position, i.e., fully winding the rotational coupling means 122 back upon the drive shaft 118, the third clutch 106 is actively coupled to the drive shaft 118, while the first and second clutches 106 are inactive, thereby precluding a reverse rotation of the generator 102 during lifting of the mass 120.

In a preferred embodiment, the retrieval unit 124 is a two-stage winch used to hoist the mass 120 to a top position (not shown separately) adjacent the drive shaft 118 after the mass 120 has descended and the power demand has subsided, or the mass 120 has attained its bottom position (not shown separately). When activated and operating, the two-stage winch rotates the drive shaft 118 in a direction opposite the direction of rotation of the drive shaft 118 caused by the action of the rotational coupling means 122 responding to the descent of the mass 120. While the mass 120 is being hoisted, the response of the retrieval shaft 126 to the activated rotation of the two-stage winch engages the third sprag clutch to rotate the drive shaft 118, which winds the rotational coupling means 122 back on the drive shaft 118. While the mass 120 is descending, the two-stage winch is inactive due to the reverse rotation of the third sprag clutch 106, responding to the rotational direction of the drive shaft 118. During descent and assent of the mass 120, a position sensor 128 monitors and reports position, direction of motion, acceleration and rate of change in position of the mass 120. Collectively, the PT&B unit 112, the PT&B shaft 114, the coupling shaft 116, the second clutch 106, drive shaft 118, the mass 120, the rotational coupling means 122, the retrieval unit 124, the retrieval shaft 126, and the position sensor 128 are referred to as an energy source delivery system 130.

Preferably, data collected by the position sensor 128 is continually relayed and acted upon by a system controller (controller) 132, used to control the overall operation of the power station 100. Additional sensory inputs are received by the controller 132 from each of a plurality of combination temperature and rotational velocity sensors 134 associated with each of the plurality of sprag clutches 106, and a power interrupt sensor 136.

In a preferred embodiment, the system controller 132 further communicates with a power switch 138 to charge a stationary rechargeable battery 140 by calling upon an alternate power source 142. The alternate power source could be, but is not limited to, and may be a combination of any of the following; commercially available electrical power, a portable motor/generator, a solar cell matrix, a portable fossil fuel burning engine, ignition of a controlled explosive, a water wheel or windmill driving a small output generator, a steam turbine turning a generator, a multi-stage gas turbine driving a generator, even livestock turning a turn stile, or any alternate energy source. In addition to providing regeneration energy for the stationary rechargeable battery 140, the alternate power source 142, also provides the energy used by the retrieval unit 124 for returning the mass 120 the full-up position.

FIG. 1 also shows that the system controller 132 communicates with the generator 102, the GBT 108, the PT&B unit 112, and the retrieval unit 124, to monitor and control the operation of the power station 100. When the power system is not generating power, the system controller 132 monitors the charge level of the stationary rechargeable battery 140, the demand for power on the generator 102 and the status of the alternative power source.

In an embodiment that incorporates the use of a solar cell matrix as one of the forms of the alternate power source 142 and a two-stage winch as the retrieval unit 124, during periods of activation by solar energy, the solar cell is used to power a first stage of the two-stage winch to raise the mass 120 to its full-up position, thereby converting solar energy to potential energy and storing the potential energy in the form of the suspended mass 120. Once the mass 120 is at its full-up position, the system controller activates the power switch 138 to direct the output from the solar cell matrix to the stationary rechargeable battery 140 for use in charging and maintaining a proper charge level for the stationary rechargeable battery 140. In an alternate embodiment, commercially available electricity could be used to perform the same functions as just described for the usage of the solar cell matrix. In either case, the intended use of the power station is for an emergency power generation station.

When the controller 132 receives a signal from the power interruption sensor 136 that power has been lost, a demand for power is placed on the generator 102, the system controller 132 senses that demand and activates the power switch 138 to divert power from the stationary rechargeable battery 140, to the PT&B unit 112. The PT&B unit 112 operates under a normally closed mechanical brake (not separately shown). The power diverted from the stationary rechargeable battery 140, is used to activate a number of a plurality of solenoids used to controllably release the mechanical brake. The mechanical brake is released by an amount sufficient to allow the mass 120 to fall at a predetermined rate sufficient to provide an input torque to the generator 102 that will generate power sufficient to match the demand. That is, the mass 120 will descend at the predetermined, substantially constant RPM, in response to a level of load placed upon the generator 102.

During operation of the power station 100, the system controller 132 continues to monitor the power demand level placed on the generator 102 and activates additional solenoids as demand for power increases and deactivates engaged solenoids as demand for power decreases. When a demand for power from the generator 102 is no longer present, or the mass 120 has reached its lower position, the system controller 132 reverts to controlling the use of the retrieval unit 124 to raise the mass 120 to its full-up position and to the maintenance of the stationary rechargeable battery 140.

FIG. 1 further shows the presence of an additional energy source delivery system 130A communicating with the GBT 108. The additional energy source delivery system 130A configured to be substantially similar to the energy source delivery system 130. As such, each element of the additional energy source delivery system 130A having similar and substantially the same form and function as the elements of the energy source delivery system 130 have been labeled in a like manner, but distinguished by the addition of the alpha character "A."

Inclusion of the additional energy source delivery system 130A facilitates an extended use of the power station 100, an ability to deliver a higher level of power output, or an ability to use the power station in a continuous manner by raising the mass 120 during the time period that the mass 120A is providing the input energy for generation of power by the generator 102, and conversely, by raising the mass 120A during the time period that the mass 120 is providing the input energy for generation of power by the generator 102.

The amount of mass 120 used by the power station 100, the power generation capabilities of generator 102, the distance between the full-up position and the bottom position of the mass 120 are all dependent on the demand profile for each specific application of the power station 100. The recovery time for the system, the amount of time required to raise the mass from the bottom position to the full-up position, depends on the gearing of the winch, the amount of mass presented by mass 120, and the amount of storage capacity of the stationary rechargeable battery 140 to aid in the raising of the mass 120. Once these factors are determined, the recovery time can be calculated.

In situations where recovery time is of the essence, the alternate power source 142 communicates with a second stage of the two-stage winch while operating under the control of the system controller 132 to provide power to the two-stage winch for raising the mass 120. The alternate power source 142 may take the form of a gas turbine or stationary diesel engine.

The advantages of the power station 100 over conventional emergency backup systems, is that the power station 100 has the capability of generating a large amount of power over a short period of time. In a preferred embodiment, the power station 100 is intended to provide power, over a limited duration, in situations where battery backups or conventional motor generators or portable power generators are not practical and where long recovery times are not a primary concern. For example, the power station 100 provides a novel method of storing solar energy for future use with the ability to match heightened power demands at low operational costs.

Figure 2:
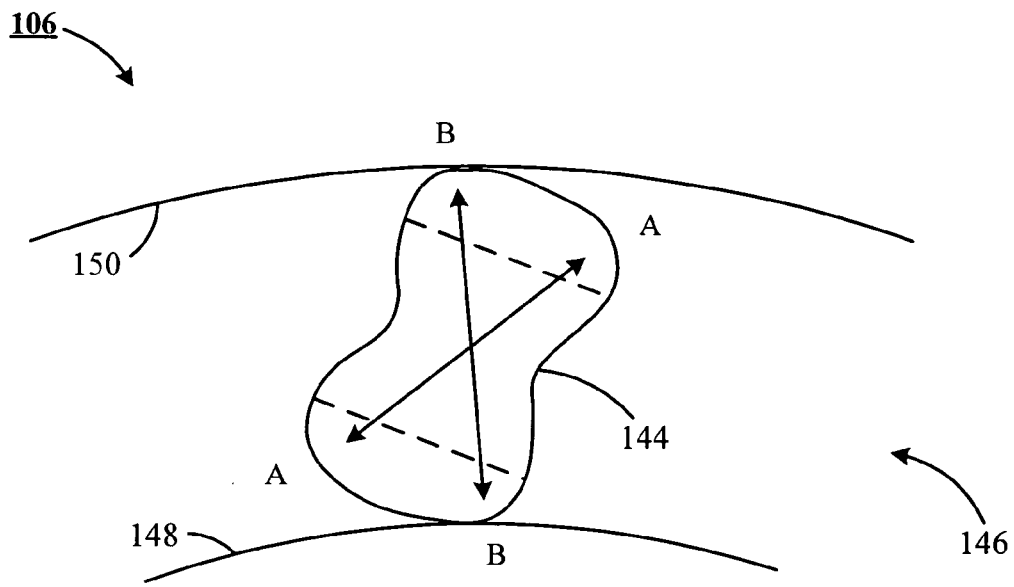
FIG. 2 is a simplified diagram of a sprag clutch used by the demand responsive power generation system of FIG. 1.

FIG. 2 shows, in simple form, the sprag clutch 106 consists of a full complement of shaped steel sprags 144, located in the annular space 146 between concentric inner and outer races, 148 and 150 respectively. Power is transmitted from one race to the other, for example from inner race 148 to outer race 150 by the wedging action of the sprags 144 between the inner and outer races, 148 and 150 respectively. Each sprag 144 is so shaped that dimension AA is greater than BB. Rotation of one race in the 'driving' direction causes the sprags 144 to tilt, thus transmitting the torque in full from one race to the other. Conversely rotation of the race in the other direction frees the sprags 144 and permits over-running between the inner and outer races, 148 and 150 respectively.

Figure 3:
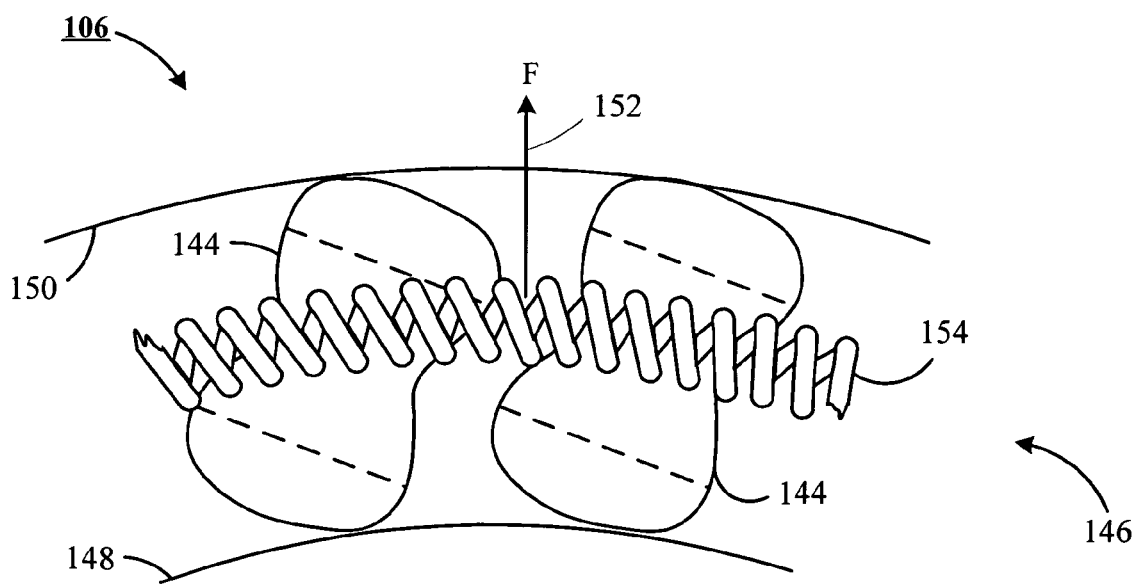
FIG. 3 is an alternate simplified diagram of a sprag clutch used by the demand responsive power generation system of FIG. 1.

FIG. 3 shows a tilting force F 152 imparted by a coil spring 154, keeps the sprags 144 in light contact with both inner and outer races, 148 and 150 respectively. Thus there is no lost motion, the driving torque being instantaneously transmitted between races 148 and 150. Various spring arrangements are used to provide force F, a typical one being the expanding coil spring 154 as shown. In any clutch of this type, the transmitting capacity is dependent on the total load carrying area.

Figure 4:
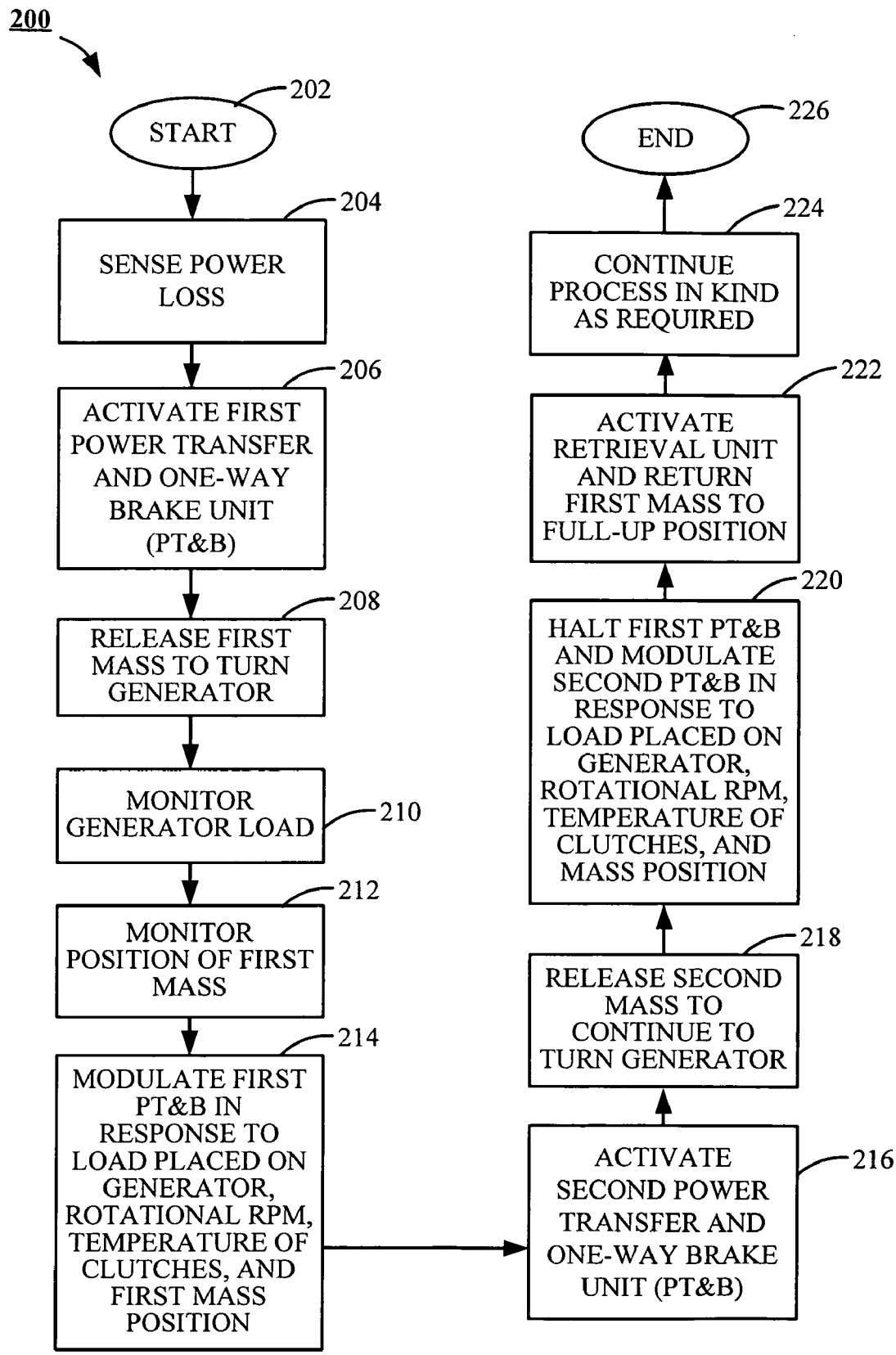
FIG. 4 is a flow chart of a method of providing power from the demand responsive power generation system of FIG. 1.

FIG. 4 shows a method 200 for using a demand responsive power generation system (such as 100) in accordance with a preferred embodiment of the present invention for generation of electrical power. The method 200 commences at start step 202 and continues to process step 204. At process step 204, a controller (such as 132) determines presence of a power loss based on an input signal from a power interrupt sensor (such as 136). In response to the sensed power loss the controller activates a first power transfer and brake unit (PT&B) (such as 112) at process step 206.

At process step 208, in response to its activation, the PT&B releases a first mass (such as 120), the descent of which turns a generator (such as 102). At process step 210, the controller monitors the demand load being placed on the generator, and the rotational speed and temperature of each of a plurality of sprag clutches (such as 106). At process step 212, the controller monitors the position and rate of descent of the first mass with a position sensor (such as 128) to determine a predicted timing for activation of a second PT&B (such as 112A) to release a second mass (such as 120A), for continued generation of power.

At process step 214, the controller modulates the first PT&B in response to the load placed on the generator, the rotational speed of the generator (preferably held at a predetermined, substantially constant RPM), the temperature of each of the plurality of sprag clutches, and the position of the first mass. At process step 216, the controller releases the second PT&B to bring on line a second energy source delivery system (such as 130A). At process step 218, the second energy source delivery system is brought on line by release of the second mass to continue to turn the generator at the predetermined, substantially constant RPM.

At process step 220, the controller halts activation of the first PT&B, which suspends descent of the first mass, and modulates the second PT&B in response to the load placed on the generator, the rotational speed of the generator (again, preferably held at a predetermined, substantially constant RPM), the temperature of each of the plurality of sprag clutches (such as 106A), and the position of the second mass. At process step 222, the controller activates a first retrieval unit (such as 124), which returns the first mass to its full-up position. Rewinding of the first mass may occur concurrently with the operation of the second energy delivery system. Conversely, during operation of a first energy delivery system (such as 130), the second mass may be raised to its full-up position. It is also noted that both the first and second energy delivery systems may be operated simultaneously through the incorporation of a combining gear box and transmission (such as 108). At process step 224, the demand responsive power generation system continues to operate in kind, as required, and concludes in process step 226.

Accordingly, the present invention is a demand responsive power generation system (such as 100), which includes a controller (such as 132) monitoring power demand conditions, an energy delivery system (such as 130) responsive to the controller providing rotational energy from an attached descending mass (such as 120), a combining gear box and transmission (such as 108) communicating with the energy delivery system transferring the rotational energy to a generator (such as 102) for generation of power by steps for generating power.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed by the appended claim.

What is claimed is:

1. An apparatus comprising:
a controller monitoring power demand conditions placed on an energy delivery system to activate and deactivate power delivery by the energy delivery system;
a first power transfer and one-way brake unit responsive to the controller providing rotational energy through release of a suspended mass operatively coupled to the first power transfer and one-way brake unit; and
a combining gear box and transmission communicating with the first power transfer and one-way brake unit transferring the rotational energy to a generator for generation of power, wherein the controller modulates the first power transfer and one-way brake unit to maintain the rate of descent of the suspended mass to assure a substantially constant rotational speed of the generator during power generation a drive shaft supporting a rotational coupling means secured to suspended mass and a position sensor monitoring a direction of the shaft.

2. The apparatus of claim 1, further comprising:
a first clutch interposed between the drive shaft and the first power transfer and one-way brake unit, the first clutch transferring the rotational energy to the first power transfer and one-way brake unit in response to a monitored rotation of the drive shaft in a first direction, and precluding transfer of the rotational energy to the first power transfer and one-way brake unit in response to a monitored rotation of the drive shaft in a second direction.

3. The apparatus of claim 2, further comprising:
a retrieval unit responsive to the controller for selectively returning the suspended mass to a full-up position relative to the first power transfer and one-way brake unit subsequent to release of the suspended mass; and
a second clutch interposed between the retrieval unit and the drive shaft, the second clutch transferring mass retrieval energy to the drive shaft in response to activation of the retrieval unit, and precluding reverse rotation of the retrieval unit in response to a descent of the suspended mass.

4. The apparatus of claim 3, further comprising:
a stationary rechargeable battery operably coupled to the controller;
a power switch interposed between the stationary rechargeable battery and the retrieval unit; and
an alternate power source communicating with the controller and the retrieval unit, in which the controller communicates with the power switch to charge the stationary rechargeable battery by calling upon an alternate power source.

5. The apparatus of claim 4, further comprising:
a third clutch interposed between the combining gear box and transmission and the generator, the third clutch transferring rotational energy to the generator in response to a first rotational direction of the combining gear box and transmission while precluding reverse rotation of the generator in response to a second rotational direction of the combining gear box and transmission; and
a combination temperature and rotational velocity sensor communicating with the third clutch providing control signals to the controller during operation of the combining gear box and transmission.

6. The apparatus of claim 5, further comprising a second combination temperature and rotational velocity sensor communicating with the first clutch providing control signals to the controller during operation of the first power transfer and one-way brake unit.

7. The apparatus of claim 6, further comprising a third combination temperature and rotational velocity sensor communicating with the second clutch providing control signals to the controller during operation of the retrieval unit.

8. The apparatus of claim 7, in which the controller modulates the first power transfer and one-way brake unit in response to control signals provided by the first combination temperature and rotational velocity sensor.

9. The apparatus of claim 8, in which the controller further modulates the first power transfer and one-way brake unit in response to control signals provided by the second combination temperature and rotational velocity sensor.

10. The apparatus of claim 9, in which the controller modulates the retrieval unit in response to control signals provided by the third combination temperature and rotational velocity sensor.

11. The apparatus of claim 10, further comprising a second power transfer and one-way brake unit responsive to the controller providing additional rotational energy through release of a second suspended mass operatively coupled to the second power transfer and one-way brake unit, wherein the second power transfer and one-way brake unit transfers the rotational energy through the combining gear box and transmission to the generator for generation of power, wherein the controller modulates the second power transfer and one-way brake unit to maintain the rate of descent of the second suspended mass to assure the substantially constant rotational speed of the generator during power generation.

12. The apparatus of claim 11, further comprising:
a second drive shaft supporting a second rotational coupling means secured to the second suspended mass;
a second position sensor monitoring a direction of rotation of the second drive shaft; and
a fourth clutch interposed between the second drive shaft and the second power transfer and one-way brake unit, the fourth clutch transferring the rotational energy to the second power transfer and one-way brake unit in response to a monitored rotation of the second drive shaft in a first direction, and precluding transfer of the rotational energy to the second power transfer and one-way brake unit in response to a monitored rotation of the second drive shaft in a second direction.

13. A method for generating power by steps comprising:
sensing a power demand with a power interrupt sensor;
activating a first power transfer and one-way brake unit in response to the sensed power loss;
releasing a first suspended mass communicating with the first power transfer and one-way brake unit in response to the activation of the first power transfer and one-way brake unit, the first suspended mass providing rotational energy through a first clutch to a combining gear box and transmission during descent of the first suspended mass;
transferring the rotational energy from the combining gear box and transmission to an electrical energy generator;
generating electricity with the electrical energy generator in response to the transferred rotational energy;
monitoring during the generation of the electricity:
an electrical load placed on the electrical energy generator;
an amount of descent of the first suspended mass;
a rotational speed of the combining gear box and transmission; and
a temperature of the first clutch; and
modulating the first power transfer and one-way brake unit in response to the monitored load, amount of descent, rotational speed, and clutch temperature to control the level of electricity generated by the electrical energy generator.

14. The method of claim 13, further comprising steps of:
activating a second power transfer and one-way brake unit in response to the electrical load placed on the electrical energy generator during the generation of the electricity;
releasing a second suspended mass communicating with the second power transfer and one-way brake unit in response to the activation of the second power transfer and one-way brake unit, the second suspended mass providing additional rotational energy through a second clutch to the combining gear box and transmission during descent of the second suspended mass;
transferring the additional rotational energy from the combining gear box and transmission to the electrical energy generator; and
generating additional electricity with the electrical energy generator in response to the electrical load placed on the electrical energy generator during the generation of the electricity.

15. The method of claim 13, further comprising steps of:
activating a second power transfer and one-way brake unit in response to the rotational speed of the combining gear box and transmission during the generation of the electricity;
releasing a second suspended mass communicating with the second power transfer and one-way brake unit in response to the activation of the second power transfer and one-way brake unit, the second suspended mass providing additional rotational energy through a second clutch to the combining gear box and transmission during descent of the second suspended mass;
transferring the additional rotational energy from the combining gear box and transmission to the electrical energy generator; and
generating additional electricity with the electrical energy generator in response to the rotational speed of the combining gear box and transmission during the generation of the electricity.

16. The method of claim 13, further comprising steps of:
activating a second power transfer and one-way brake unit in response to the temperature of the first clutch during the generation of the electricity;
releasing a second suspended mass communicating with the second power transfer and one-way brake unit in response to the activation of the second power transfer and one-way brake unit, the second suspended mass providing additional rotational energy through a second clutch to the combining gear box and transmission during descent of the second suspended mass;
transferring the additional rotational energy from the combining gear box and transmission to the electrical energy generator; and
generating additional electricity with the electrical energy generator in response to the temperature of the first clutch during the generation of the electricity.

17. The method of claim 16, further comprising steps of:
halting the descent of the first suspended mass during the generation of the electricity;
continuing the provision of the additional rotational energy through the second clutch to the combining gear box and transmission during descent of the second suspended mass;
transferring the additional rotational energy from the combining gear box and transmission to the electrical energy generator;
generating additional electricity with the electrical energy generator in response to the halt of the descent of the first suspended mass during the generation of the electricity; and
activating a retrieval unit to return the first mass to a full-up position relative to the first power transfer and one-way brake unit.

18. A demand responsive power generation combination comprising:
a controller monitoring power demand conditions;
an energy delivery system responsive to the controller providing rotational energy by means for providing rotational energy; and
a combining gear box and transmission communicating with the energy delivery system transferring the rotational energy to a generator for generation of power by steps for generating power.

19. The combination of claim 18, in which the means for providing rotational energy comprising:
a first power transfer and one-way brake unit responsive to the controller providing rotational energy through release of a suspended mass operatively coupled to the first power transfer and one-way brake unit; and
a second power transfer and one-way brake unit responsive to the controller providing additional rotational energy through release of a second suspended mass operatively coupled to the second power transfer and one-way brake unit.

20. The combination of claim 19, in which the steps for generating power comprises:

sensing a power demand with a power interrupt sensor;

activating a first power transfer and one-way brake unit in response to the sensed power loss;

releasing a first suspended mass communicating with the first power transfer and one-way brake unit in response to the activation of the first power transfer and one-way brake unit, the first suspended mass providing rotational energy through a clutch to the combining gear box and transmission during descent of the first suspended mass;

transferring the rotational energy from the combining gear box and transmission to the generator;

generating electricity with the generator in response to the transferred rotational energy;

monitoring during the generation of the electricity:

an electrical load placed on the generator;

an amount of descent of the first suspended mass;

a rotational speed of the combining gear box and transmission; and a temperature of the clutch; and modulating the first power transfer and one-way brake unit in response to the monitored load, amount of descent, rotational speed, and clutch temperature to control the level of electricity generated by the generator.

* * * * *